(12) United States Patent
Yim et al.

(10) Patent No.: US 9,419,549 B2
(45) Date of Patent: Aug. 16, 2016

(54) METHOD AND APPARATUS FOR CONTROLLING AN ELECTRIC MACHINE IN A SIX-STEP MODE

(71) Applicant: GM GLOBAL TECHNOLOGY OPERATIONS LLC, Detroit, MI (US)

(72) Inventors: Jung Sik Yim, Torrance, CA (US); Bon Ho Bae, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 64 days.

(21) Appl. No.: 14/541,176

(22) Filed: Nov. 14, 2014

(65) Prior Publication Data

US 2016/0141982 A1    May 19, 2016

(51) Int. Cl.
H02P 27/08    (2006.01)
H02P 6/00    (2016.01)
H02P 6/16    (2016.01)

(52) U.S. Cl.
CPC . *H02P 6/002* (2013.01); *H02P 6/16* (2013.01)

(58) Field of Classification Search
CPC ........... H02P 6/00; H02P 27/06; H02P 27/08; H02P 7/29
USPC ................................ 318/700, 400.13, 400.17
See application file for complete search history.

(56) References Cited

U.S. PATENT DOCUMENTS

| 6,704,212 | B2 | 3/2004 | Furukawa et al. |
| 6,842,354 | B1 | 1/2005 | Tallam et al. |
| 7,843,162 | B2 | 11/2010 | Bae et al. |
| 8,963,453 | B2 * | 2/2015 | Hong ...................... H02M 1/14 318/41 |
| 2005/0128777 | A1 | 6/2005 | Yamanaka et al. |
| 2006/0034364 | A1 * | 2/2006 | Breitzmann ...... H02M 7/53871 375/238 |
| 2012/0014147 | A1 * | 1/2012 | Radosevich ........ H02M 1/0845 363/71 |
| 2014/0070735 | A1 | 3/2014 | Luedtke |

OTHER PUBLICATIONS

Asano, Inaguma, Ohtani, Sato, Okamura, Sasaki; "Hign Performance Motor Drive Technologies for Hybrid Vehicles"; 2007 IEEE.
Hyunjae Yoo, Seung-Ki Sul; "Novel Current Control Strategy for Maximum Tracking Operation under Saturated Voltage Condition"; IAS 2005 IEEE.
Del Blanco, Degner, Lorenz; "Dynamic Analysis of Current Regulators for AC Motors Using Complex Vectors"; IEEE vol. 35, No. 6, Nov./Dec. 1999.
Holtz, Lotzkat, Khambadkone; "On Continuous Control of PWM Inverters in the Overmodulation Range Including the Six-Step Mode"; IEEE vol. 8, No. 4, Oct. 1993.

* cited by examiner

*Primary Examiner* — Bentsu Ro
(74) *Attorney, Agent, or Firm* — Quinn Law Group, PLLC

(57) ABSTRACT

An inverter electrically operatively connects to a multi-phase electric machine, and a method for controlling the inverter includes executing a six-step mode to control the inverter and monitoring an electric voltage angle of the electric machine at a preset sampling frequency. When the electric voltage angle approaches a step transition associated with control of one of a plurality of switches of the inverter in the six-step mode, an intermediate duty command for the one of the switches is determined and a carrier signal is aligned based upon a present state of the one of the switches. The one of the switches is controlled employing the intermediate duty command and the aligned carrier.

12 Claims, 3 Drawing Sheets

METHOD AND APPARATUS FOR CONTROLLING AN ELECTRIC MACHINE IN A SIX-STEP MODE

TECHNICAL FIELD

The present disclosure generally relates to controlling alternating current (AC) motor/generators, and more particularly relates to apparatus, systems and methods for controlling AC motor/generators.

BACKGROUND

Control of AC motor/generators, such as three-phase permanent magnet synchronous electric motors (electric machines) is accomplished using a three-phase pulsewidth-modulated (PWM) inverter. A PWM inverter can be controlled in several different operation modes, including, e.g., a space vector PWM (SVPWM) mode and a six-step mode. Magnitude of the output voltage from an inverter at its fundamental frequency reaches its maximum only when the inverter operates in the six-step mode. Due to this voltage magnitude characteristic, operation in the six-step mode can increase torque capability of an electric machine compared to known SVPWM operation or discontinuous space vector PWM (DPWM) operation in the field-weakening region where the voltage magnitude is the major limiting factor of the torque capability. However, voltage magnitude is not controllable in the six-step mode. Furthermore, known methods for frequency-synchronized control of an inverter operating in the six-step mode require updating and potentially changing sampling frequency of the controller each sampling period to minimize sub-harmonics, which can be computationally taxing on the controller.

SUMMARY

An inverter electrically operatively connects to a multi-phase electric machine, and a method for controlling the inverter includes executing a six-step mode to control the inverter and monitoring an electric voltage angle of the electric machine at a preset sampling frequency. When the electric voltage angle approaches a step transition associated with control of one of a plurality of switches of the inverter in the six-step mode, an intermediate duty command for the one of the switches is determined and a carrier signal is aligned based upon a present state of the one of the switches. The one of the switches is controlled employing the intermediate duty command and the aligned carrier.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
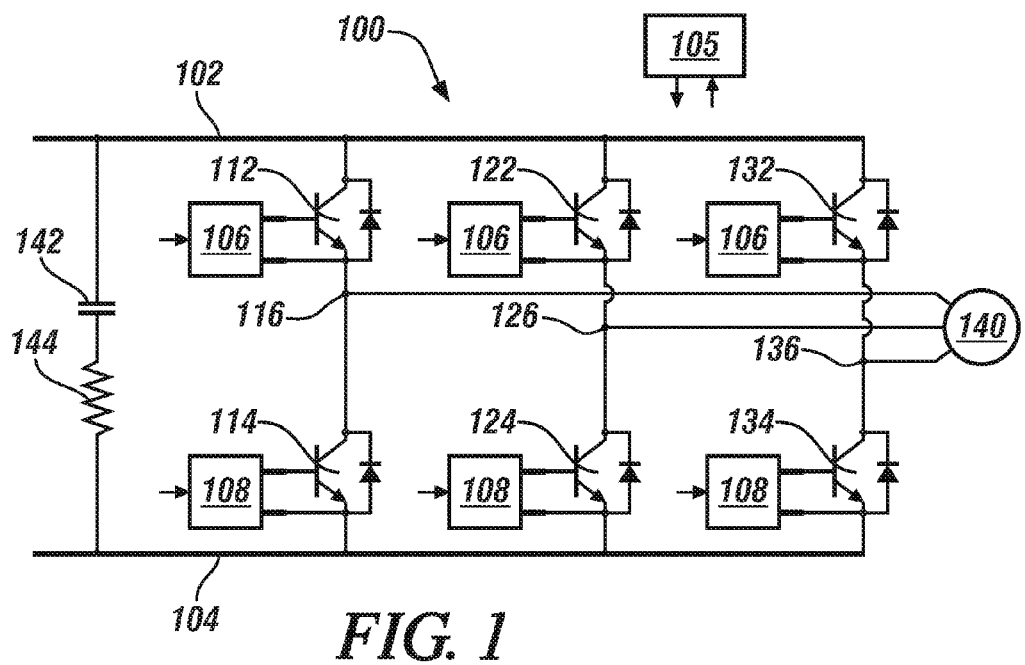
FIG. 1 schematically illustrates a controller including a current regulator and a six-step flux controller for controlling an inverter electrically connected to a multi-phase AC electric motor/generator (electric machine) in a six-step mode, in accordance with the disclosure.

Referring now to the drawings, wherein the depictions are for the purpose of illustrating certain exemplary embodiments only and not for the purpose of limiting the same, FIG. 1 schematically illustrates a Voltage Source Inverter (VSI) controller 105 for controlling a multi-phase PWM inverter circuit (inverter) 100 electrically operatively connected to a multi-phase AC electric motor/generator (electric machine) 140 in accordance with the disclosure. The electric machine 140 is preferably a permanent magnet synchronous device including a stator and a rotor arranged in a star configuration, although the concepts described herein are not so limited. Rotational position and speed of the rotor of the electric machine 140 is monitored by a rotational position sensor 141, which can be any suitable device, e.g., a resolver or a Hall-effect sensor.

The inverter 100 electrically connects to a high-voltage DC power source via a positive high-voltage DC power bus (HV+) 102 and a negative high-voltage DC power bus (HV−) 104. The high-voltage DC power source can include a high-voltage electrical energy storage device, e.g., a high-voltage battery or a capacitor, a high-voltage electric power generator or another related device or system. The inverter 100 includes a plurality of switch pairs 112 and 114, 122 and 124, and 132 and 134 electrically connecting in series between HV+ 102 and HV− 104. Each of the switch pairs corresponds to a phase of the electric machine 140, with each of the first switches connecting in series with the corresponding second switch at a node. Specifically, switch pairs 112 and 114 connect in series at node 116 to form a first arm of the inverter 100, switch pairs 122 and 124 connect in series at node 126 to form a second arm of the inverter 100 and switch pairs 132 and 134 connect in series at node 136 to form a third arm of the inverter 100. The nodes 116, 126 and 136 electrically connect to nominal first, second and third phases of the electric machine 140 to transfer electric power thereto. A first gate drive circuit 106 controls activation and deactivation of the first, high-side switches 112, 122 and 132 and a second gate drive circuit 108 controls activation and deactivation of the second, low-side switches 114, 124 and 134. The first and second gate drive circuits 106, 108 include any suitable electronic device capable of activating and deactivating the switches 112 and 114, 122 and 124, and 132 and 134 to effect power transfer between one of HV+ 102 and HV− 104 and a phase of the electric machine 140 in response to control signals originating at controller 105. The controller 105 generates control signals that are communicated to the first and second gate drive circuits 106, 108 to activate and deactivate the switches 112 and 114, 122 and 124, and 132 and 134 in response to an inverter switch control mode that can include a space vector PWM (SVPWM) mode and a six-step mode, or another suitable control mode. The inverter 100 includes other electrical components including capacitors, e.g., DC bus capacitor 142, resistors, e.g., bus resistor 144 and other electrical circuit components to accomplish functions related to electrical noise suppression, load balancing and the like.

Each of the first switches 112, 122 and 132 and second switches 114, 124 and 134 can be controlled to either an ON state or an OFF state. Each of the arms formed by the switch pairs 112 and 114, 122 and 124, and 132 and 134 can be controlled to a control state of 1 or 0. A control state of 1 for one of the arms corresponds to activation of one of the first switches 112, 122 and 132 with a corresponding second switch 114, 124 or 134, respectively, deactivated. A control state of 0 for one of the arms corresponds to activation of one of the second switches 114, 124 and 134 with corresponding first switch 112, 122 or 132, respectively, deactivated.

Each of the first switches 112, 122 and 132 is preferably configured as a normally-OFF switch, meaning that the switch conducts electrical current only when activated by the first gate drive 106. In one embodiment, the first switches 112, 122 and 132 are Insulated Gate Bipolar Transistors (IGBTs) each having a diode arranged in parallel. The first gate drive 106 activates each of the first switches 112, 122 and 132 to effect current flow thereacross responsive to the selected inverter switch control mode. Each of the second switches 114, 124 and 134 is preferably configured as a normally-OFF switch, meaning that the switch conducts electrical current only when activated by the second gate drive 108. The second switches 114, 124 and 134 may be any kind of normally-OFF semiconductor switch, including, e.g., IGBT switches each having a diode arranged in parallel. During operation in absence of a circuit fault, the first and second gate drive circuits 106, 108 generate activation signals to activate and deactivate the first switches 112, 122 and 132 and the second switches 114, 124 and 134 to operate the electric machine 140 to generate torque. Alternatively, the second switches 114, 124 and 134 may be any kind of normally-ON semiconductor switch. The inverter 100 electrically operatively connects to the electric machine 140 in that the action of selectively activating and deactivating switches 112 and 114, 122 and 124, and 132 and 134 to effect power transfer between one of HV+ 102 and HV− 104 and a phase of the multi-phase electric machine 140 in response to control signals originating at controller 105 induces an electric field in an element of a stator of the electric machine 140 that acts on an element of the rotor to urge movement of the rotor towards or away from the stator, thus inducing torque in a shaft member mechanically coupled to the rotor.

The controller 105 monitors signal inputs from sensors, e.g., the rotational position sensor 141 and selectively controls operation of the inverter 100 in one of a PWM mode and a six-step mode in response to a torque or speed command. The controller 105 controls torque output from the electric machine 140 through the inverter 100, which electrically connects to a high-voltage DC electric power supply via HV+102 and HV− 104. Control methods for switching among inverter states to regulate torque output of the electric machine 140 include operating in either a PWM mode or a six-step mode. In the PWM mode, the inverter 100 switches rapidly among two of the non-zero states and one or two of the zero states. The controller 105 specifies what fraction of the time is spent in each of the three states by specifying PWM duty cycles. The controller 105 updates the PWM duty cycles at regular intervals such that the frequency of updates is significantly higher than the frequency of the rotor rotation. In the six-step mode, the inverter 100 cycles through the six non-zero states once per cycle of the rotor of the electric machine 140 to produce an AC voltage and current in each winding of the stator. A rotor cycle is defined relative to motor poles and does not necessarily correspond to a complete revolution of the rotor. The controller 105 includes a current regulator and a flux controller for controlling operation of inverter 100 to control operation of the electric machine 140 in either a PWM mode or the six-step mode. The amplitude of the AC voltage is dictated by the magnitude of DC voltage on the high-voltage DC bus that electrically connects a high-voltage electric power source to the inverter 100. The torque is dictated by the DC voltage, the rotor speed, and the phase difference between these quasi-sinusoidal AC voltage signals and the rotor position, and is further controlled by operating the control system in six-step mode. The controller 105 issues commands to the inverter 100 indicating when to switch to the next state in the sequence. The six-step mode is an operating mode of the inverter 100 that includes cycling the inverter 100 through the six non-zero states once per cycle of the rotor of the electric machine 140 to produce an AC voltage and current in each winding of the stator. A rotor cycle is defined relative to motor poles and does not correspond to a complete revolution of the rotor when a multi-pole electric machine is employed. By way of example, in a permanent magnet electric machine, the fundamental frequency can be determined as follows:

$$\omega r = \omega rm * PP$$

wherein
ωr is the fundamental frequency;
ωrm is the mechanical motor speed or frequency; and
PP is the quantity of pole pairs of the electric machine.

Similarly, when an induction motor electric machine is employed, the fundamental frequency can be determined as follows:

$$\omega e = \omega rm * PP + \omega sl$$

wherein
ωe is the fundamental frequency;
ωrm is the mechanical motor speed or frequency;
PP is the quantity of pole pairs of the electric machine; and
ωrm is the slip frequency.

The fundamental frequency we is physically equivalent to rotating frequency of the rotor flux, and is also referred to as synchronous frequency.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds during ongoing operation. Alternatively, routines may be executed in response to occurrence of an event such as input from a monitored sensor. Communications between controllers and between controllers, actuators and/or sensors may be accomplished using a direct wired link, a networked communications bus link, a wireless link or any another suitable communications link. Communications include exchanging data signals in any suitable form, including, for example, electrical signals via a conductive medium, electromagnetic signals via air, optical signals via optical waveguides, and the like.

Figure 2:
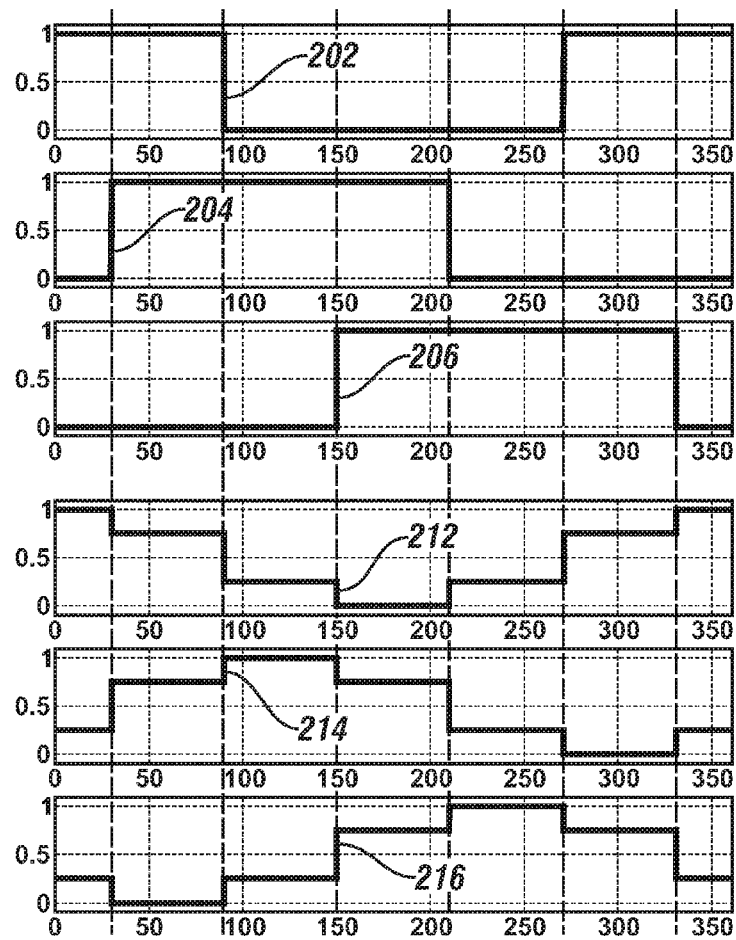
FIG. 2 graphically shows switch states of first, second and third arms of an embodiment of an inverter in relation to voltage angle (deg) when operating in the six-step mode, in accordance with the disclosure.

FIG. 2 graphically shows switch states Sa 202, Sb 204 and Sc 206 of the first, second and third arms of an embodiment of the inverter 100 in relation to voltage angle 210 (deg) when operating in the six-step mode, with a state value of 1 corresponding to an ON state for the arm and a state value of 0 corresponding to an OFF state for the arm. Resultant phase voltage levels include Va 212 associated with first node 116, Vb 214 associated with second node 126 and Vc 216 associated with third node 136, all in relation to voltage angle 210 (deg) are also shown. Thus, operation in the six-step mode changes switching state to the commanded voltage angle with the switching state of each arm changed only once in one fundamental period, i.e., one rotor or electrical cycle. The resultant phase voltage has six step-changes in one fundamental period. When the switch is assumed to be ideal with no voltage drop, the peak voltage at the fundamental frequency becomes $$\frac{2}{\pi} \cdot V_{dc}.$$

The output power of inverter 100 can be defined as V·I·PowerFactor, and inverter 100 can deliver its theoretical maximum output power to the electric machine when operating in the six-step mode.

Sub-harmonics can be caused in a motor control system due to differences between a sampling frequency of a digital controller and rotational speed of the electric machine. Known motor control systems adjust the sampling frequency in powers of six of the fundamental frequency of the voltage command, which requires the next sampling frequency to be calculated during every rotation with a corresponding calculation burden imposed on the controller. Both steady-state and transient performance of the closed-loop current controller can be sensitive to the performance of rotational speed and position sensors because the fundamental frequency of the voltage command varies with the motor speed, thus introducing further variation.

Figure 3:
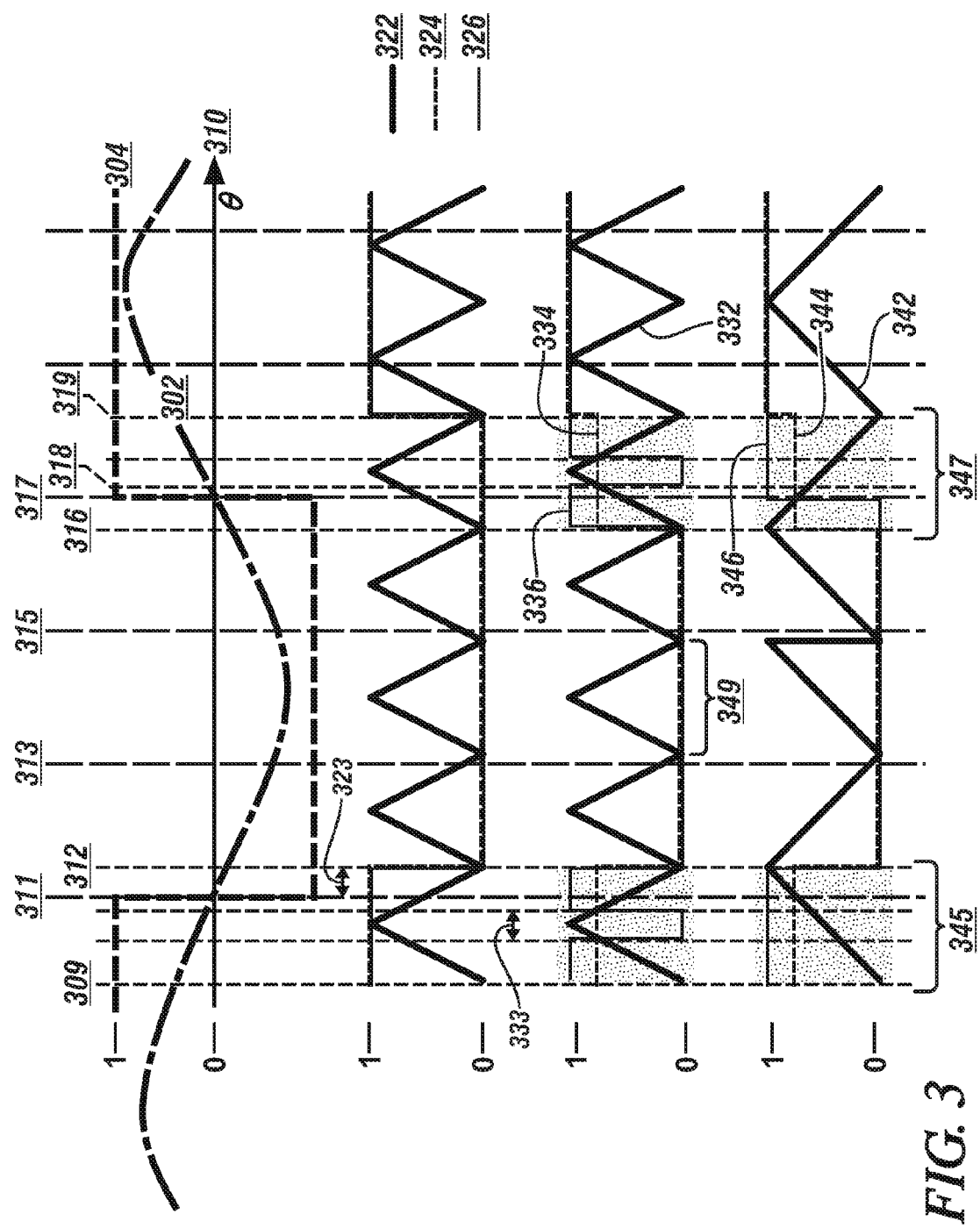
FIG. 3 graphically shows a plurality of command and data signals associated with operation of one phase of an inverter over a portion of a single cycle of electrical rotation of the electric machine and including operation related to execution of an intermediate control scheme in the form of a second carrier signal, an intermediate duty command and an aligned PWM waveform, in accordance with the disclosure.
Figure 4:
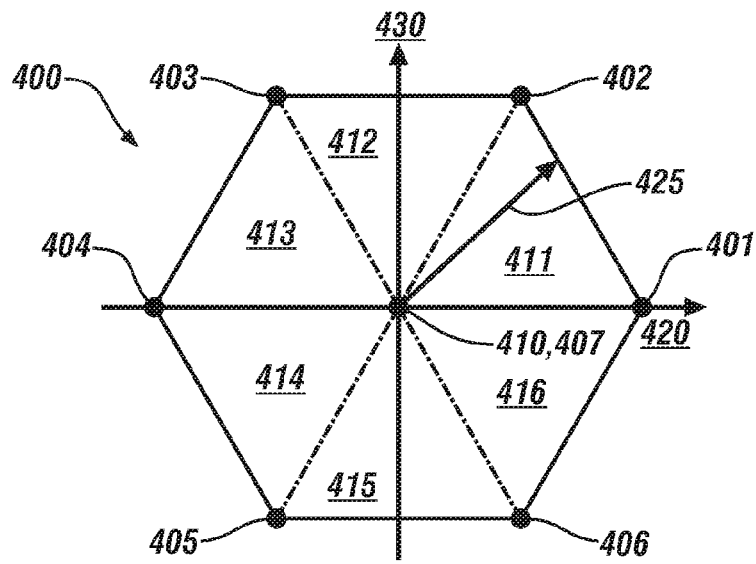
FIG. 4 graphically shows a stationary direct-quadrature (stationary dq or αβ) reference frame for analyzing operation of a three-phase inverter including operating sectors for determining intermediate duty commands, in accordance with the disclosure.

FIGS. 3 and 4 are associated with a method for frequency-synchronized control of an inverter operating in the six-step mode to power an electric machine responsive to a torque or speed command without changing sampling frequency of a controller while minimizing or eliminating sub-harmonics. One embodiment of a method for frequency-synchronized inverter control in six-step mode is described with reference to FIG. 5. The frequency-synchronized control method can be implemented, for example, on an embodiment of the inverter 100, electric machine 140 and controller 105 described with reference to FIGS. 1 and 2. This includes executing the six-step mode to control the inverter while monitoring an electric voltage angle of the electric machine at a preset sampling frequency of a digital controller. When the angle of the $\alpha\beta$ voltage command is near a step transition associated with one of the arms of the inverter in the six-step mode, an intermediate duty command is calculated, and carrier alignment changes are implemented with execution of the intermediate duty command to synchronize execution of the six-step mode with the fundamental frequency of the voltage command: this is equivalent to the rotating speed/frequency of the rotor in PM or rotor flux in IM. Such operation facilitates a carrier-based PWM implementation for controlling the inverter in the six-step mode that is synchronized with the fundamental frequency of the voltage command without adjusting the sampling frequency of digital controller to synchronize with motor speed. As a result, the performance of the current control loop is not controlled based upon performance of the position and speed sensors.

FIG. 3 graphically shows a plurality of command and data signals associated with operation of one phase of an inverter over a portion of a single cycle of electrical rotation of the electric machine, which is shown as a voltage angle 310 ($\theta$, deg) on the horizontal axis. Rotational positions of the electric machine are shown in the form of voltage angles of 90° 311, 150° 313, 210° 315 and 270° 317. Line 302 shows rotational position of the electric machine and line 304 shows a preferred command for one of the switches of one of the arms of the inverter in relation to the voltage angle 310 when operating in the six-step mode. The preferred command 304 is responsive to the torque or speed command. The voltage angle of 90° 311 corresponds to a step-change in the preferred command 304 for the associated switch from an ON state with a value of 1 to an OFF state with a value of 0. The voltage angle of 270° 317 corresponds to a step-change in the preferred command 304 from an OFF state with a value of 0 to an ON state with a value of 1.

First carrier signal 322, duty command 324 and PWM waveform 326 graphically depict operation of an embodiment of the inverter 100 in the six-step mode without synchronization of the sampling period of the rotational position of the electric machine 140 with the operation of the inverter 100. The first carrier signal 322 is in the form of a repetitively executing a center-aligned triangle wave varying between a nominal value of 1 and a nominal value of 0 and having a cycle period that is substantially less than a cycle period associated with the fundamental frequency of the voltage command. As shown, the center-aligned triangle wave starts at 0 state, increases to 1 state and then decreases to 0 state during one cycle period. The duty command 324 for commanding operation of the inverter in the six-step mode includes a nominal value of 1 to turn on the upper switch of phase A and a nominal value of 0 to turn on the bottom switch of phase A. As shown, the first carrier signal 322 is asynchronous with the voltage command 302, and is not aligned with the ideal transition angle of switching status at either 90° 311 or 270° 317. The first carrier signal 322 and the duty command 324 are provided as inputs to a signal comparator, which generates a signal output in the form of line 326 showing a resulting PWM waveform. The resulting PWM waveform 326 has a nominal value of 1 when the magnitude of the duty command 324 is greater than the magnitude of the first carrier signal 322 and a nominal value of 0 when the magnitude of the duty command 324 is less than the magnitude of the first carrier signal 322. The PWM waveforms, including PWM waveforms 326, 336 and 346 described herein correspond to the control signals described with reference to FIG. 1 that are generated by controller 105 and communicated to one of the first and second gate drive circuits 106, 108 to activate and deactivate one of the switches 112 and 114. As shown, the voltage command angles are shown for the single phase of the inverter when the inverter is operating without benefit of synchronizing the switching period with electrical rotation of the rotor of the electrical machine. As is appreciated, the use of the first carrier signal 322 in the form of a center-aligned triangle wave is illustrative and not limiting. Other forms of carrier signals may be employed with similar effect.

The lack of synchronization of the switching period with the fundamental frequency of the voltage command is shown as an asynchronous time period $T_{comp}$ 323, which is a time delay between a change in the preferred command 304 from an ON state with a value of 1 to an OFF state with a value of 0 at the voltage angle of 90° 311 and a change in the actual duty command 324 from an ON state with a value of 1 to an OFF state with a value of 0 at a subsequent voltage angle 312.

The asynchronous time period $T_{comp}$ 323 may be determined during an immediately previous switch cycle. In the six-step mode, the magnitude of the phase voltage becomes its maximum at the fundamental frequency. If the switch is assumed to be ideal so there is no voltage drop, the peak voltage at the fundamental frequency becomes $$\frac{2}{\pi} \cdot V_{dc}.$$

Because the output power of a 3-phase PWM inverter can be defined as V·I·PowerFactor, a 3-phase PWM inverter can deliver its theoretical maximum output power to the motor in the six-step mode. In full six-step mode, the switching state needs to be changed at every 60° of the voltage command. However, the controller 105 updates its output only once in a sampling period. Assuming that the sampling ratio, $$\frac{f_{sw}}{f_r},$$

is 20, the angle of the voltage command advances $$\frac{360°}{20} = 13°$$

in one sampling period. Thus, when the sampling period of the controller is not synchronized with the fundamental period of the voltage command, the transition of the switching state in full six-step mode can have maximum ±13° error compared to the voltage command. The output voltage of a PWM inverter can have sub-harmonics due to this error. This sub-harmonic in the phase voltage can create sub-harmonics in phase current and thus in the output torque of the electric machine. As shown, the average of the switching signal in one fundamental period is not 0.5. When the average is larger than 0.5, the six-step voltage has a longer peak in that period. When the average is smaller than 0.5, the six-step voltage has shorter peak. As shown, the average of the switching signal is 0.429, so the six-step voltage has a shorter peak.

FIG. 3 further graphically shows operation related to execution of an intermediate control scheme in the form of a second carrier signal 332, an intermediate duty command 334 and an intermediate PWM waveform 336. The intermediate duty command 334 is introduced to adjust the magnitude of the average of the switching signal in a manner that prevents sub-harmonic frequencies in the control and operation of the electric machine. The intermediate duty command 334 gives a duty command that is neither 0 nor 1 when the voltage angle 310 is approaching one of the electric machine rotational angles of interest, e.g., rotational angles of 30, 90, 150, 210, 270 and 330 degrees. The voltage angle 310 is considered to be a one of the rotational angles of interest when the period of the oncoming cycle of the carrier signal, e.g., second carrier signal 322, overlaps with one of the rotational angles of interest. As shown, carrier signal 322 overlaps with the voltage command angle at a rotational angle of 90° at timepoint 311 and carrier signal 322 overlaps with rotational position of the electric machine at rotational angle of 270° at timepoint 317.

The magnitude of the intermediate duty command 334 is selected to keep the average voltage of the switching signal the same as that of the preferred voltage 304 in the six-step waveform. For example, in the first switching period shown by lines 324 and 326, the duration of the peak of the non-synchronized six-step duty command 324 is longer than that of the synchronized six-step duty command shown by preferred command 304 by a period of time $T_{comp}$ 323. In this case, the magnitude of the intermediate duty command 334 in that switching period, i.e., between timepoints 309 and 312 can be reduced to a magnitude that causes a reduction of the PWM waveform 336 to zero for a valley duration of $T_{comp}$ 333 that is equivalent to the expected $T_{comp}$ 323. This is shown as intermediate duty command 334 and resulting PWM waveform 336. Carrier command 332 corresponds to the first carrier command 322 and is in the form of a triangle wave. The intermediate duty command 334 causes the average of the switching signal in one fundamental period to be zero regardless of the synchronization of the switching period to the voltage command. As shown in this case, sub-harmonics can be eliminated.

The use of the intermediate duty command 334 may introduce undesirable glitches into the PWM waveform 336. Glitches are avoided by changing alignment of the carrier signal, i.e., changing the alignment of the carrier command 332 without changing the frequency or period of the carrier command 332. In one embodiment, the carrier command 332 is in the form of a triangle, and the triangle configuration can be one of a right-aligned, center-aligned or left-aligned carrier waveform. Examples of the right-aligned carrier waveform 347, center-aligned carrier waveform 349 and left-aligned carrier waveform 345 are shown. The intermediate control scheme is implemented by aligning the carrier signal 322 based upon the intermediate duty command 344 to avoid glitches. The intermediate duty command 334 interacts with the carrier signal 322 to achieve a PWM waveform 346 that results in an absence of glitches.

Thus, the carrier command 342 is a left-aligned waveform 345 that is selected to avoid a glitch that would otherwise occur in response to the intermediate duty command 344 prior to shifting the PWM waveform for commanding the associated switch of the inverter to an OFF or 0 state. Similarly, as shown starting at timepoint 316, the right-aligned carrier waveform 347 is selected to avoid a glitch between timepoints 318 and 319 that would otherwise occur in response to the intermediate duty command 344 prior to shifting the PWM waveform for commanding the associated switch of the inverter to an ON or 1 state.

Furthermore, delays associated with latencies in operation of the digital controller need accommodation. A voltage command or duty command calculated in one switching period, for example, [n] period, is actually updated at the next switching period, [n+1]. For this reason, angle advance during one switching period, $\omega \cdot T_{sw}$, is considered in the intermediate duty command calculation. This rotating direction also needs to be considered in both the intermediate duty calculation and the carrier signal alignment decision because rotor or rotor flux can rotate in both clockwise (negative) and counter-clockwise (positive) direction.

Referring again to FIG. 1, the first and second gate drive circuits 106, 108 activate only one of the switches of each of the switch pairs 112 and 114, 122 and 124, and 132 and 134 to effect power transfer between one of HV+102 and HV−104 and a phase of the electric machine 140 in response to control signals originating at controller 105. Switching both switches in one of the switch pairs to the ON state causes an undesirable short-circuit between one of HV+102 and HV−104, and is thus avoided. Switching both switches in one of the switch pairs to the OFF state causes an undesirable disconnection of the phase terminal from the power source resulting in a floating voltage state. Generally one digit numeral is employed to express the switching state of one arm, i.e., of each of the switch pairs 112 and 114, 122 and 124, and 132 and 134. A switch state of 1 indicates the upper switch is activated and the terminal voltage is connected to HV+ 102. A switch state of 0 indicates the lower switch is activated and the terminal voltage is connected to HV− 104. By way of example, when switch 112 of the switch pair 112 and 114 is activated, with switch 114 deactivated, the switching state is expressed as follows:

$$S_A = 1 \quad [1]$$

Likewise, when switch 112 of the switch pair 112 and 114 is deactivated, with switch 114 activated, the switching state is expressed as follows $$S_A = 0 \quad [2]$$

This can be extended to all three phases of $S_A$, $S_B$, and $S_C$. For example, if the switching state is expressed as (1, 0, 0), the actual switching state includes switch 112 ON, switch 114 OFF, switch 122 OFF, switch 124 ON, switch 132 OFF and switch 134 ON.

As such, each phase voltage can be calculated with the switching state as follows, wherein $V_{as}$ represents voltage magnitude at first node 116, $V_{bs}$ represents voltage magnitude at second node 126 and $V_{cs}$ represents voltage magnitude at third node 136.

$$V_{as} = \frac{2}{3} \cdot V_{dc} \cdot S_A - \frac{1}{3} \cdot V_{dc} \cdot (S_B + S_C) \quad [3]$$

$$V_{bs} = \frac{2}{3} \cdot V_{dc} \cdot S_B - \frac{1}{3} \cdot V_{dc} \cdot (S_C + S_A) \quad [4]$$

$$V_{cs} = \frac{2}{3} \cdot V_{dc} \cdot S_C - \frac{1}{3} \cdot V_{dc} \cdot (S_A + S_B) \quad [5]$$

FIG. 4 graphically shows a stationary direct-quadrature (stationary dq or αβ) reference frame 400 for analyzing operation of a three-phase inverter, e.g., inverter 100 described with reference to FIG. 1, with the analysis shown in context of direct voltage $v_\alpha$ 420 on the horizontal axis and quadrature voltage $v_\beta$ 430 on the vertical axis. Voltage at one point in operation is shown as vector $v_{\alpha\beta}$ 425. A three-phase circuit, e.g., the inverter 100 shown with reference to FIG. 1, can be mathematically transformed to rotate a reference frame of the three-phase system (abc) to a stationary dq (αβ) frame to simplify analysis and control thereof by transforming three-phase stator and rotor quantities into a single rotating reference frame to eliminate effects of time varying inductances. A three-phase inverter, e.g., inverter 100 includes three arms, each arm having two possible switching states leading to eight combinations of switch states. The switch states are indicated by voltage vectors as follows in Table 1, wherein the three-phase voltages in each switching state are converted from three-phase with the resultant αβ voltages shown as voltage vectors V0 410, V1 401, V2 402, V3 403, V4 404, V5 405, V6 406 and V7 407 in FIG. 4. Operating sectors are also shown, including sector I 411 between vectors V1 401 and V2 402, sector II 412 between vectors V2 402 and V3 403, sector III 413 between vectors V3 403 and V4 404, sector IV 414 between vectors V4 404 and V5 405, sector V 415 between vector V5 405 and vector V6 406 and sector VI 416 between vector V6 406 and vector V1 401.

TABLE 1

| Vector | $S_A$ | $S_B$ | $S_C$ |
|---|---|---|---|
| V0 | 0 | 0 | 0 |
| V1 | 1 | 0 | 0 |
| V2 | 1 | 1 | 0 |
| V3 | 0 | 1 | 0 |
| V4 | 0 | 1 | 1 |
| V5 | 0 | 0 | 1 |
| V6 | 1 | 0 | 1 |
| V7 | 1 | 1 | 1 |

When operating in a positive speed condition, the intermediate duty cycle commands (Duty_A, Duty_B, Duty_C) and carrier alignment (Alignment) for each of the sectors can be determined as follows in Table 2.

TABLE 2

| Sector | Duty_A | Duty_B | Duty_C | Alignment |
|---|---|---|---|---|
| I | 1.0 | INT6 | 0.0 | Left |
| II | INT1 | 1.0 | 0.0 | Right |
| III | 0.0 | 1.0 | INT2 | Left |
| IV | 0.0 | INT3 | 1.0 | Right |
| V | INT4 | 0.0 | 1.0 | Left |
| VI | 1.0 | 0.0 | INT5 | Right |

The terms INT1, INT2, INT3, INT4, INT5 and INT6 represent equations to calculate the intermediate duty commands, as follows, wherein the term $\theta v_{\alpha\beta}$ represents the electrical angle for the vector $v_{\alpha\beta}$ 425 and $\omega \cdot T_{sw}$ represents angle advance during one switching period:

$$INT1: \frac{\left(\frac{1}{2} \cdot \pi - \theta_{v_{\alpha\beta}}\right)}{\omega \cdot T_{sw}} \quad [6]$$

$$INT2: 1 - \frac{\left(\frac{5}{6} \cdot \pi - \theta_{v_{\alpha\beta}}\right)}{\omega \cdot T_{sw}} \quad [7]$$

$$INT3: \frac{\left(\frac{7}{6} \cdot \pi - \theta_{v_{\alpha\beta}}\right)}{\omega \cdot T_{sw}} \quad [8]$$

-continued $$INT4: 1 - \frac{\left(\frac{3}{2} \cdot \pi - \theta_{v_{\alpha\beta}}\right)}{\omega \cdot T_{sw}} \quad [9]$$

$$INT5: \frac{\left(\frac{11}{6} \cdot \pi - \theta_{v_{\alpha\beta}}\right)}{\omega \cdot T_{sw}} \quad [10]$$

$$INT6: 1 - \frac{\left(\frac{1}{6} \cdot \pi - \theta_{v_{\alpha\beta}}\right)}{\omega \cdot T_{sw}} \quad [11]$$

When operating in a negative speed condition, the intermediate duty cycle commands (Duty_A, Duty_B, Duty_C) and carrier alignment (Alignment) for each of the sectors can be determined as follows in Table 3.

TABLE 3

| Sector | Duty_A | Duty_B | Duty_C | Alignment |
|--------|--------|--------|--------|-----------|
| I      | 1.0    | 0.0    | INT12  | Left      |
| II     | 1.0    | INT7   | 0.0    | Right     |
| III    | INT8   | 1.0    | 0.0    | Left      |
| IV     | 0.0    | 1.0    | INT9   | Right     |
| V      | 0.0    | INT10  | 1.0    | Left      |
| VI     | INT11  | 0.0    | 1.0    | Right     |

The terms INT7, INT8, INT9, INT10, INT11 and INT12 represent equations to calculate the intermediate commands, as follows, wherein the term $\theta_{v_{\alpha\beta}}$ represents the electrical angle for the vector $v_{\alpha\beta}$ 425 and $\omega \cdot T_{sw}$ represents angle advance during one switching period:

$$INT7: \frac{\left(\frac{1}{6} \cdot \pi - \theta_{v_{\alpha\beta}}\right)}{\omega \cdot T_{sw}} \quad [12]$$

$$INT8: 1 - \frac{\left(\frac{1}{2} \cdot \pi - \theta_{v_{\alpha\beta}}\right)}{\omega \cdot T_{sw}} \quad [13]$$

$$INT9: \frac{\left(\frac{5}{6} \cdot \pi - \theta_{v_{\alpha\beta}}\right)}{\omega \cdot T_{sw}} \quad [14]$$

$$INT10: 1 - \frac{\left(\frac{7}{6} \cdot \pi - \theta_{v_{\alpha\beta}}\right)}{\omega \cdot T_{sw}} \quad [15]$$

$$INT11: \frac{\left(\frac{3}{2} \cdot \pi - \theta_{v_{\alpha\beta}}\right)}{\omega \cdot T_{sw}} \quad [16]$$

$$INT12: 1 - \frac{\left(\frac{11}{6} \cdot \pi - \theta_{v_{\alpha\beta}}\right)}{\omega \cdot T_{sw}} \quad [17]$$

Figure 5:
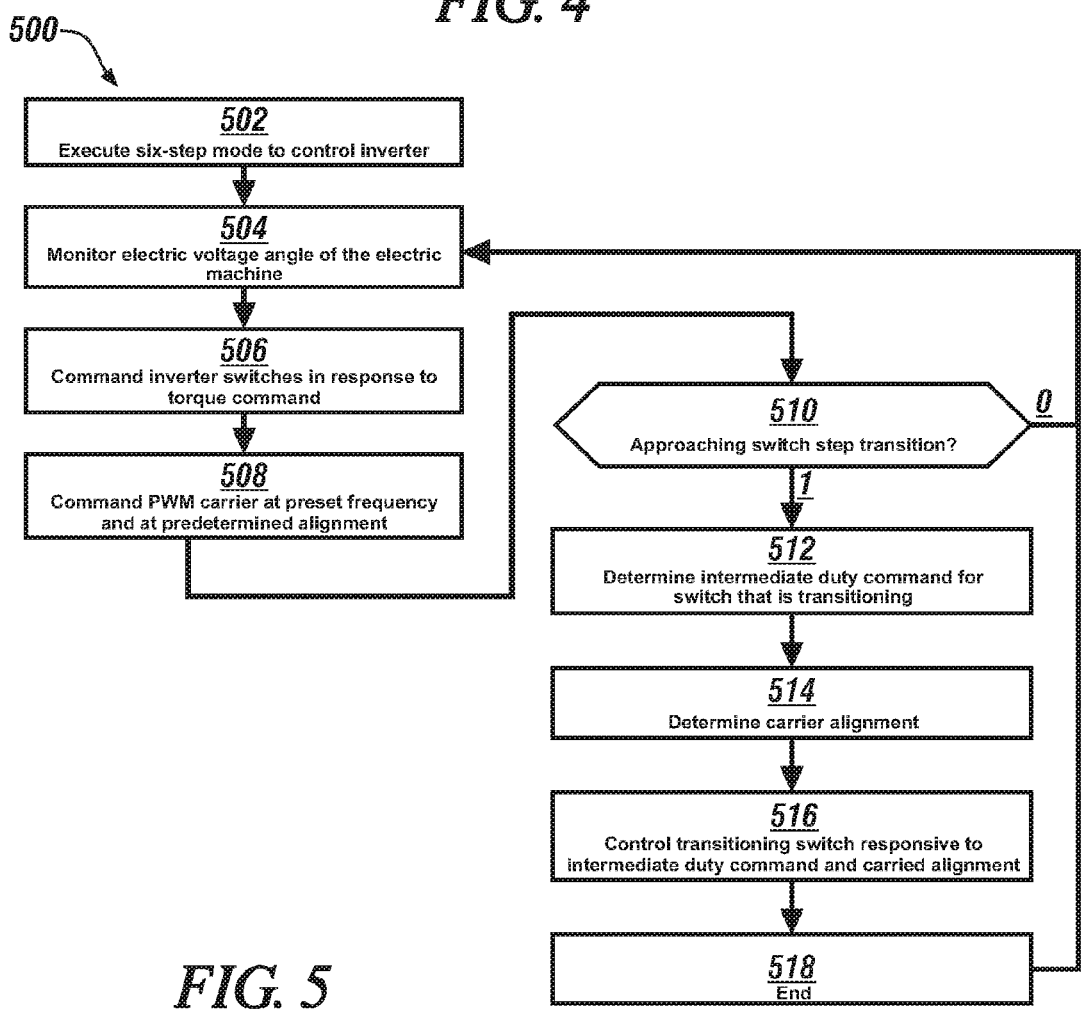
FIG. 5 schematically shows an inverter control routine for frequency-synchronized inverter control in six-step mode to synchronize execution of the six-step mode with the fundamental frequency of the voltage command, in accordance with the disclosure.

FIG. 5 schematically shows an inverter control routine 500 for frequency-synchronized inverter control in six-step mode. The inverter control routine 500 controls the inverter in the six-step mode to synchronize execution of the six-step mode with the rotation of the electric machine. The inverter control routine 500 can be employed to control an embodiment of the inverter 100 described with reference to FIG. 1. Table 4 is provided as a key wherein the numerically labeled blocks and the corresponding functions are set forth as follows, corresponding to the inverter control routine 500.

TABLE 4

| BLOCK | BLOCK CONTENTS |
|-------|----------------|
| 502 | Execute six-step mode to control inverter |
| 504 | Monitor electric voltage angle of the electric machine |
| 506 | Command inverter switches in response to torque command |
| 508 | Command PWM carrier at preset frequency and at predetermined alignment |
| 510 | Approaching switch step transition? |
| 512 | Determine intermediate duty command for switch that is transitioning |
| 514 | Determine carrier alignment |
| 516 | Control transitioning switch responsive to intermediate duty command and carrier alignment |
| 518 | End |

The inverter control routine 500 relates to executing the six-step mode to control the inverter (502), which includes monitoring an electric voltage angle of the electric machine (504). Monitoring the electric voltage angle of the electric machine can include monitoring at a preset sampling rate driven by a preset sampling frequency of an analog/digital converter electrically connected to the controller, or monitoring in response to a triggering event, such as a rising edge signal or a falling edge signal generated by a Hall-effect sensor or in response to another rotational position sensor. The inverter operates in the six-step mode, including commanding the switches in response to a torque command by cycling the inverter switches through six non-zero states once per rotor cycle to produce an AC voltage and current in each winding of the stator (506), and commanding the PWM carrier at a preset frequency and a predetermined alignment (508) to execute operation. The routine determines whether a step transition in one of the switches is approaching (510). A step transition in one of the switches is approaching when the electrical rotational angle approaches a rotational angle of interest as indicated when a period of an oncoming cycle of the PWM carrier overlaps with one of the rotational angles of interest, e.g., rotational angles of 30, 90, 150, 210, 270 and 330 degrees.

When a step transition in one of the switches is approaching (510)(1) an intermediate duty command is determined for the switch that is transitioning, wherein the intermediate duty command is determined based upon one of equations 6 through 17, with the specific equation selected based upon the approaching angle and the specific switch that is transitioning (512). Coincidentally, the carrier alignment is selected based upon the present control state of the specific switch that is transitioning (514). In one embodiment, the selection of the specific equation and the carrier alignment is determined based upon the rotational angles of interest with attention directed toward the specific sector using FIG. 4 and Tables 2 and 3. The resultant intermediate duty command and the carrier alignment are executed to control the inverter during the period of the oncoming cycle of the PWM carrier (516) and this iteration of the routine ends (518).

In this manner, a PWM inverter can operate in six-step mode to increase torque capability of an electric machine in a flux-weakening region, resulting in increased torque output compared to operation in SVPWM mode, including synchronizing the six-step PWM waveform with the motor speed to avoid sub-harmonics ripple in phase currents without changing the sampling frequency.

The detailed description and the drawings or figures are supportive and descriptive of the present teachings, but the scope of the present teachings is defined solely by the claims.

While some of the best modes and other embodiments for carrying out the present teachings have been described in detail, various alternative designs and embodiments exist for practicing the present teachings defined in the appended claims.

The invention claimed is:

1. A method for controlling an inverter electrically operatively connected to a multi-phase AC electric machine, comprising:
    executing a six-step mode to control the inverter;
    monitoring an electric voltage angle of the electric machine at a preset sampling frequency; and
    when the electric voltage angle approaches a step transition associated with controlling one of a plurality of switches of the inverter in the six-step mode:
        generating an intermediate duty command for the one of the switches;
        aligning a carrier signal based upon a present control state of the one of the switches; and
        controlling the one of the switches employing the intermediate duty command and the aligned carrier signal.

2. The method of claim 1, wherein generating an intermediate duty command for the one of the switches comprises:
    determining a vector angle advance during a single switching period;
    determining a vector angle associated with the electric voltage angle of the electric machine; and
    determining the intermediate duty command for the one of the switches based upon the vector angle advance during a single switching period and the vector angle.

3. The method of claim 1, wherein aligning a carrier based upon a present control state of the one of the switches comprises selecting a left-aligned carrier waveform in response to the intermediate duty command prior to shifting the PWM waveform for commanding the associated switch of the inverter to an OFF state.

4. The method of claim 1, wherein aligning a carrier based upon a present control state of the one of the switches comprises selecting a right-aligned carrier waveform in response to the intermediate duty command prior to shifting the PWM waveform for commanding the associated switch of the inverter to an ON state.

5. The method of claim 1, further comprising selecting a center-aligned carrier waveform when the electric voltage angle is not approaching a step transition associated with control one of a plurality of switches of the inverter in the six-step mode.

6. The method of claim 1, wherein controlling the one of the switches employing the intermediate duty command and the aligned carrier signal comprises controlling the one of the switches employing the intermediate duty command and the aligned carrier signal to synchronize execution of the six-step mode with the rotation of the electric machine.

7. A method for controlling a voltage source inverter including a plurality of arms electrically operatively connected to phases of a permanent magnet synchronous multi-phase AC electric machine, comprising:
    executing a six-step mode to control the inverter in response to a torque command;
    monitoring a rotational angle of the electric machine at a preset sampling frequency; and
    when the electric voltage angle approaches a step transition associated with controlling one of the arms of the inverter in the six-step mode:
        generating an intermediate duty command for the one of the arms;
        aligning a carrier signal based upon a present control state of the one of the arms; and
        controlling the one of the arms employing the intermediate duty command and the aligned carrier signal.

8. The method of claim 7, wherein generating an intermediate duty command for the one of the switches comprises:
    determining a vector angle advance during a single switching period;
    determining a vector angle associated with the electric voltage angle of the electric machine; and
    determining the intermediate duty command based upon the vector angle advance during a single switching period and the vector angle.

9. The method of claim 7, wherein aligning a carrier based upon a present control state of the one of the switches comprises selecting a left-aligned carrier waveform in response to the intermediate duty command prior to shifting the PWM waveform for commanding the associated arm of the inverter to a control state of 0.

10. The method of claim 7, wherein aligning a carrier based upon a present control state of the one of the switches comprises selecting a right-aligned carrier waveform in response to the intermediate duty command prior to shifting the PWM waveform for commanding the associated arm of the inverter to a control state of 1.

11. The method of claim 7, further comprising selecting a center-aligned carrier waveform when the electric voltage angle is not approaching a step transition associated with control one of the arms of the inverter in the six-step mode.

12. The method of claim 7, wherein controlling the one of the arms employing the intermediate duty command and the aligned carrier signal comprises controlling the one of the arms employing the intermediate duty command and the aligned carrier signal to synchronize execution of the six-step mode with the rotation of the electric machine.

* * * * *